United States Patent [19]

King et al.

[11] Patent Number: 5,149,893
[45] Date of Patent: Sep. 22, 1992

[54] CATALYTIC HYDROGENATION PROCESS

[75] Inventors: Frank King, Middlesbrough; Martin E. Fakley, Stockton-on-Tees, both of United Kingdom

[73] Assignee: Imperial Chemical Industries PLC, London, England

[21] Appl. No.: 711,055

[22] Filed: Jun. 6, 1991

Related U.S. Application Data

[62] Division of Ser. No. 519,690, May 7, 1990, Pat. No. 5,041,408.

[30] Foreign Application Priority Data

May 9, 1989 [GB] United Kingdom ............... 8910623

[51] Int. Cl.$^5$ ............................................ C07C 5/10
[52] U.S. Cl. ............................... 585/267; 585/270; 585/277
[58] Field of Search ............... 585/269, 267, 270, 277

[56] References Cited

U.S. PATENT DOCUMENTS

| 3,445,402 | 5/1969 | Reitmeier | 502/328 |
| 3,549,556 | 12/1970 | Dienes | 502/335 X |
| 4,101,449 | 7/1978 | Noda et al. | 502/325 X |
| 4,410,455 | 10/1983 | Lambert | 585/260 |
| 5,041,408 | 8/1991 | King et al. | 502/328 |

FOREIGN PATENT DOCUMENTS 1278424 6/1972 United Kingdom.

Primary Examiner—Anthony McFarlane
Attorney, Agent, or Firm—Cushman, Darby & Cushman

[57] ABSTRACT

A catalytic hydrogenation process comprising contacting a catalyst effective to promote a hydrogenation reaction with a feed stream comprising gaseous hydrogen and an unsaturated hydrocarbon thereby hydrogenating at least some of said unsaturated hydrocarbon, said catalyst being prepared from a precursor comprising a calcium aluminate cement and at least one oxide of a metal selected from nickel and cobalt by reduction of said metal oxide, and wherein said precursor contains 10 to 70% by weight of said metal oxide (expressed as the divalent oxide, MO) and has a porosity in the range 25 to 50%, in which at least 30% of the pore volume is in the form of pores of size in the range 15 to 35 nm and less than 40% of the pore volume is in the form of pores of diameter greater than 35 nm.

4 Claims, No Drawings

CATALYTIC HYDROGENATION PROCESS

This is a division of application Ser. No. 07/519,690, filed May 7, 1990, now U.S. Pat. No. 5,041,408.

BACKGROUND OF THE INVENTION

This invention relates to catalysts and in particular to catalysts, or precursors thereto, containing an inert support material and at least one oxide of a metal of Group VIII of the Periodic Table and selected from nickel and cobalt.

For some catalytic applications the Group VIII metal oxide is the catalytically active species while for other catalytic applications the Group VIII metal oxide is a catalyst precursor and the catalytically active species is the product of reducing the Group VIII metal oxide to the Group VIII metal or is the product of oxidising the Group VIII metal oxide in the precursor to a higher oxidation state. For example catalysts obtained by reduction of a precursor containing nickel and/or cobalt oxide are of use as hydrogenation catalysts, eg methanation catalysts for the hydrogenation of carbon oxides to methane or catalysts for the hydrogenation of aromatic compounds such as benzene to cyclohexane. Another use of supported nickel and/or cobalt oxides is as catalysts for the decomposition of oxidising agents such as hypochlorite ions in aqueous solutions, for example in the treatment of effluents containing such ions prior to discharge of into rivers, lakes, or estuaries.

Aqueous media containing oxidising agents often have a relatively high pH: in order to prevent the catalyst particles disintegrating during use as a result of such alkaline conditions, it has previously been proposed to employ Group VIII metal oxides in intimate mixture with a metal oxide such as magnesia or alumina as a coating on a non-porous, hard fired, support of eg alumina or magnesia (see U.S. Pat. No. 4,732,688 and EP 276044) or to employ a resin binder, for example polyvinylidene fluoride, (see U.S. Pat. No. 4,400,304 and the reissue thereof U.S. Pat. No. Re. 32392). Catalysts made using the aforesaid inert non-porous supports have a relatively small Group VIII metal oxide content, typically less than 10% by weight, and usually less than 5%. While the initial activity of such materials is good, the service life of such catalysts is in some cases inadequate, as a result of loss of active material through loss of adhesion of the coating to the support. While particles made using a resin binder as aforesaid may have a somewhat greater Group VIII metal oxide content, the binder tends to restrict access of the effluent being treated to the active catalyst and also the binders necessary to withstand highly alkaline conditions are relatively expensive.

BRIEF DESCRIPTION OF THE INVENTION

We have devised catalysts, and precursors thereto, in the form of particles containing substantial proportions of the Group VIII metal oxide and in which the active material is readily accessible to the reactants. This invention is based on the finding that, surprisingly, calcium aluminate cement can withstand highly alkaline conditions.

It has been proposed in GB 1278424 to produce a methanation catalyst precursor containing nickel oxide and calcium aluminate cement in the form of spherical agglomerates having a low bulk density (in the range 0.4 to 0.656 g.cm$^{-3}$), a high porosity (in the range 55 to 75%) with a high proportion of the pores (50–70% of the total pore volume) in the form of "macropores" of diameter greater than 35 nm. We have found that materials of lower porosity and having a relatively low proportion of pores in the form of such macropores, are particularly suitable for the decomposition of oxidising agents in aqueous media.

Accordingly the present invention provides shaped particles suitable for use as a catalyst, or precursor thereto, comprising a calcium aluminate cement and at least one oxide of a Group VIII metal M selected from nickel and cobalt, said particles containing 10 to 70% by weight of said Group VIII metal oxide (expressed as the divalent oxide, MO) and having a porosity in the range 25 to 50%, particularly 30 to 50%, in which at least 30% of the pore volume is in the form of pores of size in the range 15 to 35 nm and less than 40% of the pore volume is in the form of pores of diameter greater than 35 nm.

DESCRIPTION OF THE PREFERRED EMBODIMENT

The shaped particles are preferably in the form of granules, extrudates, or pellets and preferably have an aspect ratio, by which we mean the ratio of the weight average maximum geometric dimension, eg length, to weight average minimum geometric dimension, eg diameter, of less than 3, particularly less than 2. Particles having a greater aspect ratio may be liable to suffer from breakage during use. The shaped particles preferably have a weight average maximum dimension in the range 2 to 8 mm, particularly 3 to 8 mm. This ensures that the particles have a relatively high a geometric surface area per unit bed volume, so that a bed of the particles has a relatively large external particle area exposed to the reactants without the presence of an undue proportion of fines which would lead to unacceptable pressure drop on passage of reactants through a bed of the particles.

The particles of the invention have a porosity in the range 30 to 50%. By the term porosity we mean the ratio of the volume of the pores to the volume of the particle. Porosity may be determined by measurement of the mercury and helium densities of the particles: the porosity (as a percentage) is given by $$\text{porosity} = p_{Hg} \times [1/p_{He}] \times 100$$

where $p_{Hg}$ and $p_{He}$ are respectively the mercury and helium densities.

As the porosity of the particles increases they become weaker: a porosity in the range 25 to 50%, particularly 30 to 50%, allows the reactants to have ready access to the active material within the particles but is not so large that the particles have inadequate strength. Also, the particles of the invention have a particular pore size distribution. This may be determined by mercury intrusion porosimetry. In the particles of the invention, at least 30%, and preferably 40 to 70%, of the pore volume is in the form of pores of average diameter in the range 15–35 nm and less than 40% of the pore volume is in the form of pores of average diameter above 35 nm. Particles having such a pore size are of particular utility where they are used for the decomposition of oxidising agents in aqueous media, as in that treatment, gases such as oxygen may be liberated and it is thought that if the pores were too small, such liberated gases would tend to fracture the particles, while if the pores are too large, the particles may have only a short useful life as they become unduly weakened by the slow dissolution of the support material during use. While particles of low porosity, for example as produced by standard tabletting techniques, are stronger and less liable to such fracture by liberated gases, the low porosity restricts access of the reactants to the active material and as a result the activity of the catalyst is impaired.

Largely as a result of the porosity and pore size distribution, the particles also have a relatively high BET surface area, above 10, and in particular in the range 20-100, $m^2.g^{-1}$. As a result the active material is present in a finely divided state. Such a BET surface area may be achieved by introducing the Group VIII metal oxide into the composition by a precipitation route as described hereinafter.

As a result of their composition and porosity, the shaped particles of the invention have a bulk density in the range 0.8 to 1.5, preferably 0.9 to 1.4, $g.cm^{-3}$. The bulk density is indicative of the weight of catalyst in a bed of given volume.

During use of the particles as a catalyst for the decomposition of oxidising agents, eg in effluents, the BET surface area, porosity and/or pore size distribution may change: thus the BET surface area, porosity, and the proportion of pores of size less than 35 nm may increase. The surface area, density, and porosity parameters of the shaped particles referred to herein refer to the parameters of the particles in the "as made" state, ie before use for catalytic purposes.

Shaped particles having the required porosity and pore volume characteristics may be made by a particular pelleting method as described hereinafter: shaped particles made by conventional tabletting machines have a considerably lower porosity and only a low percentage of the pore volume is in the form of pores of size above 15 nm, while shaped particles made by the agglomeration method described in GB 1278424 have a large proportion of pores of size above 35 nm.

The composition comprises at least one oxide of a Group VIII metal selected from nickel and cobalt. Preferably the Group VIII metal is nickel alone, or nickel in admixture with cobalt in an amount of up to one mole of cobalt per mole of nickel. The composition also comprises a calcium aluminate cement, by which term we mean hydraulic cements containing one or more calcium aluminate compounds of the formula $nCaO.mAl_2O_3$ where n and m are integers. Examples of such calcium aluminate compounds incluse calcium monoaluminate $CaO.Al_2O_3$, tri-calcium aluminate $3CaO.Al_2O_3$, penta-calcium tri-aluminate $5CaO.3Al_2O_3$, tri-calcium penta-aluminate $3CaO.5Al_2O_3$, and dodeca-calcium hepta-aluminate $12CaO.7Al_2O_3$.

Calcium aluminate cements are often contaminated with iron compounds. The presence of iron compounds is generally undesirable in compositions where the shaped particles are to be used, after a reduction step, as catalysts for example for hydrogenation reactions, and so for such applications a calcium aluminate cement that has a low iron content is desirable. However, for use in treating fluid, eg aqueous, media containing oxidising agents, the presence of substantial amounts, eg 5 to 20% by weight of iron oxide (expressed as $Fe_2O_3$), in the calcium aluminate cement can be tolerated and indeed may in some cases be beneficial as the iron oxide may act as a an activity promoter. Although iron oxides are amphoteric, because the iron oxide is bound into the cement, it does not leach out to any significant extent even under highly alkaline conditions such as are likely to be encountered in the treatment of aqueous medium containing hypochlorite ions. Where the shaped particles are to be used for the decomposition of oxidising agents in aqueous media, it is preferred that they contain 0.2 to 10% by weight of iron oxide expressed as $Fe_2O_3$. A particularly suitable calcium aluminate cement is that known as "ciment fondu".

As mentioned hereinbefore, the Group VIII metal oxide is preferably introduced into the composition by precipitation. A preferred route is to precipitate Group VIII metal compounds, decomposable to oxides by heating, from an aqueous solution of eg nitrates by addition of a precipitant such as an alkali metal carbonate solution. After precipitation of the Group VIII metal compounds, the precipitate is washed free of precipitant. The precipitate may be mixed with a finely divided, preferably inert, diluent material, such as magnesia (which, as shown in the aforesaid EP 276044 may have a beneficial effect on the activity of the catalyst) and/or a clay, eg kaolin. The amount of such diluent material employed is conveniently up to twice the weight of the Group VIII metal compounds expressed as the divalent oxides. The mixture is then dried, and calcined, eg to a temperature in the range 200°-600° C., particularly 400°-550° C., to effect decomposition of the Group VIII metal compounds to the oxide form. Minor amounts of other ingredients, such as co-promoters such as magnesium oxide may be incorporated, eg by co-precipitation with the Group VIII metal compounds. The resultant composition is then mixed with the calcium aluminate cement, optionally together with a processing aid such as a little water, a stearate of an alkaline earth metal, eg magnesium, and/or graphite, and formed into pellets. The proportion of cement employed is generally 25 to 100% by weight based on the total weight of the Group VIII metal oxide, or oxides, and any diluent material, and is such as to give a composition containing 10 to 70%, particularly less than 50%, and most preferably 20 to 40%, by weight of the Group VIII metal oxide or oxides.

In order to obtain shaped particles of the requisite pore volume characteristics, the mixture is conveniently pelletized by means of a pellet mill, for example of the type used for pelleting animal feedstuffs, wherein the mixture to be pelleted is charged to a rotating perforate cylinder through the perforations of which the mixture is forced by a bar or roller within the cylinder. The resulting extruded mixture is cut from the surface of the rotating cylinder by a doctor knife positioned to give pellets of the desired length. It will be appreciated that other extrusion techniques may be employed to give shaped particles of the desired characteristics.

After forming the composition into the desired shaped particles, the latter are then preferably contacted with water, preferably as steam, to effect hydration of the cement and to give the shaped particles adequate strength.

Shaped particles formed by this method have a significantly lower strength, eg as measured by a crushing test, than pellets prepared by a conventional tabletting technique but it is found that, even so, the strength is adequate for the applications envisaged and, indeed, the strength generally increases where the catalyst is employed for the decomposition of oxidising agents in aqueous media, presumably as a result of continued hydration of the cement.

For use for the decomposition of oxidising agents, the catalyst bed is contacted with a fluid medium, particularly aqueous, containing the oxidising agent to be treated. Examples of oxidising agents that may be decomposed using the shaped particles of the invention include hypohalite ions, for example hypochlorite and hypobromite ions, and hydrogen peroxide. At least some of such oxidising agents are pollutants in various industrial processes. In particular hypochlorite ions are a significant industrial pollutant.

Conveniently a fixed bed of the catalyst particles is formed and the medium containing the oxidising agent, for example hypochlorite ions, is passed through the bed. Generally the medium is in the form of an aqueous solution which has been filtered prior to contact with the catalyst bed.

The treatment of aqueous media is conveniently effected under conditions such that the pH of the medium is above 7, preferably above 8; it is a particularly beneficial aspect of the invention that the particles do not physically disintegrate even at pH levels in the range 10 to 14. The process can be performed at any convenient temperature, suitably in the range 5°–100° C., more suitably in the range 20°–80° C.

When the shaped particles are contacted with the oxidising agent in an aqueous medium, some or all of the oxides of the particles may become hydrated. In addition the Group VIII metal oxides are oxidised to higher valency states. For example nickel oxide can be notionally considered to be initially present in the particles as NiO. Authorities vary as to precisely what higher oxides of nickel are formed but it may be regarded that the higher oxides $Ni_3O_4$, $Ni_2O_3$ and $NiO_2$ are formed on contact with the oxidising agent. Such higher oxides are active in the process of decomposition of the oxidising agent. In the particles of the present invention, the Group VIII metal oxides may be as initially formed or in their higher oxidation states, as formed in use. In use the oxides may also be present as hydrates. It should be noted, however, that the proportions specified herein of the Group VIII metal oxide in the particles are expressed on the basis of anhydrous oxides with the Group VIII oxides in the divalent state, ie NiO and/or CoO.

In addition to use for the decomposition of oxidising agents as described above, the shaped particles of the invention are also of use as precursors to hydrogenation catalysts, and may be converted to the catalytically active form by reduction, eg with a stream of a hydrogen-containing gas at an elevated temperature. Such reduction may be effected after charging the particles to a vessel in which the hydrogenation is to be effected. Alternatively, the reduction may be effected as a separate step prior to charging the particles to the hydrogenation reactor and, if desired, the reduced particles may be passivated by contact with a gas stream containing a small amount of oxygen, or with carbon dioxide followed by a gas stream containing a small amount of oxygen, until no further reaction occurs when the particles may then be handled in air at ambient temperature.

The invention is illustrated by the following examples in which all parts and percentages are by weight.

EXAMPLE 1

A slurry containing precipitated basic nickel carbonate, and a mixture of finely divided magnesia and kaolin as diluent materials, was filtered, washed, dried, and then calcined at 400°–450° C. The slurry contained about 17 parts of magnesia and 104 parts of kaolin per 100 parts of nickel, so that the calcined material contained about 13.3 parts of magnesia and about 82 parts of kaolin per 100 parts of nickel oxide.

100 parts of the calcined material were then mixed with about 2 parts of graphite and 50 parts of a calcium aluminate cement having an aluminium to calcium atomic ratio of about 1.4 and having an iron content, expressed as $Fe_2O_3$, of about 15%, to give a dry feed mixture.

The dry feed mixture was then mixed with water (25 parts per 100 parts of the cement-containing mixture), formed into extruded pellets of diameter of about 3 mm and lengths in the range of about 3 to 5 mm using a pellet mill as described hereinbefore, and then dried to give extrudates A.

For purposes of comparison a similar dry feed mixture was formed into tablets of diameter and length about 3 mm using a conventional tabletting machine, and then the resulting tablets were soaked in water at room temperature, and then dried to give tablets B.

Further for purposes of comparison, a granulated product was made following the procedure of GB 1278424. Thus a dry powder feed mixture of the calcined material and calcium aluminate cement was made up as in the production of extrudates A except that the graphite was omitted. This mixture was granulated, with water addition, using a disc granulator of 20 cm diameter. After initial scouting experiments to determine suitable conditions, a tilt angle of 60°, a speed of 30 rpm, and a feed of the dry powder, via a vibrating feeder, at an overall rate of about 30 g/min, alternating with spraying of water on to the dish in bursts of about 20–40 seconds, were found to give granules, wherein about 50% by weight had a size within the range 2–4 mm, and were otherwise similar to those described in GB 1278424. It was found that, in order to obtain granules that could be handled easily without breakage, the amount of water required, about 75 ml per 100 g of dry feed, was rather more than indicated in the aforesaid GB 1278424. Using those conditions, granules were produced and the product sieved to select those granules, which were designated granules C, of size range 2–4 mm.

The physical properties of the extrudates A, tablets B, and granules C, are set out in Table 1.

120 ml of the extrudates A were charged to a reactor of internal diameter 2.5 cm to form a catalyst bed therein. Another reactor of the same size was charged with 120 ml of tablets B. A feed of an aqueous solution containing sodium hypochlorite and sodium hydroxide and having a pH of about 12.5 was preheated to about 60° C. was fed to the reactors in parallel so that the hypochlorite solution flowed up through the catalyst bed. The concentration of hypochlorite in the feed, the space velocity (SV) through each bed, and the exit sodium hypochlorite concentration were monitored. The results are shown in Table 2. From Table 2 it is seen that, after an initial period, the activity of the extrudates is significantly greater than that of the tablets B.

When granules C were tested in similar fashion, they showed high activity, as good as or better than extrudates A, but the outlet line was always dark with suspended solids-analysis revealed that the effluent from the catalyst bed typically contained 78 ppm of combined nickel, indicating that the catalyst was rapidly being leached away. (In contrast, the effluent from the bed of extrudates A typically contained only 1.8 ppm of combined nickel). The high nickel content of the effluent from the bed of granules C could well explain their apparent high activity as the leached nickel would continue to act as catalyst for hypochlorite decomposition after the effluent has left the catalyst bed: as a consequence the effective space velocity is very low. After a total of about 1600 hours, granules C had disintegrated and leached to such an extent that only about 20% of the original volume of catalyst charged to the reactor remained therein.

TABLE 1

| | | Extrud. A | Tablets B | Granules C |
|---|---|---|---|---|
| Analysis* (%) | NiO | 30.6 | | 35.2 |
| | Al$_2$O$_3$ | 30.5 | | 25.3 |
| | CaO | 12.0 | | 13.3 |
| | Fe$_2$O$_3$ | 5.5 | | 6.0 |
| | MgO | 3.7 | | 4.1 |
| | SiO$_2$ | 16.0 | | 14.6 |
| | Other** | 1.7 | | 1.5 |
| BET surface area (m$^2 \cdot$ g$^{-1}$) | | 31.7 | 37.0 | 91.0 |
| Helium density (g $\cdot$ cm$^{-3}$) | | 2.84 | 2.87 | 3.04 |
| Mercury density (g $\cdot$ cm$^{-3}$) | | 1.81 | 2.23 | 0.96 |
| Bulk density (g $\cdot$ cm$^{-3}$) | | 0.95 | 1.08 | 0.61 |
| Porosity (%) | | 36 | 22 | 68 |
| Pores >35 nm (%) | | 29 | 25 | 59 |
| Pores 15-35 nm (%) | | 44 | 25 | 33 |
| Crush strength (kg)+ | | 5.3 | 15.8 | <1 |

*After ignition at 900° C.
**Minor components such as TiO$_2$ and alkali metal oxides resulting from contaminants in the starting materials or introduced during the formation of the shaped particles.
+Mean load required to crush particles with the load applied perpendicular to the longitudinal axis of the shaped particles. The quoted figure is the value obtained on the particles as made: because further hydration of the cement may occur, the strength may increase during use.

TABLE 2

| time (hr) | space velocity (hr$^{-1}$) | NaOCl concn. (g/100 ml) feed | outlet Extruds. A | outlet Tablets B | NaOCl removed (%) A | NaOCl removed (%) B |
|---|---|---|---|---|---|---|
| 72 | 1.30 | 7.19 | 0.086 | | 98.8 | |
| 96 | 2.32 | 6.85 | | 0.11 | | 98.4 |
| 936 | 0.88 | 8.38 | | 0.13 | | 98.4 |
| 1416 | 1.33 | 5.89 | 0.112 | | 98.1 | |
| 4100 | 1.00 | 6.14 | 0.006 | | 99.9 | |
| 4344 | 1.10 | 6.14 | | 0.14 | | 97.7 |
| 5112 | 1.39 | 5.57 | | 0.16 | | 97.1 |
| 6310 | 1.04 | 6.12 | 0.008 | | 99.9 | |
| 7128 | 1.20 | 7.59 | 0.010 | | 99.9 | |
| 7368 | 1.51 | 7.59 | | 0.28 | | 96.3 |
| 11664 | 0.80 | 8.04 | 0.030 | 0.28 | 99.6 | 96.5 |

In the following Examples 2-7, the procedure of Example 1 used to make extrudates A was repeated with minor modifications, including in each case the use of a pellet mill producing extrudates of diameter about 1.6 mm and lengths in the range of about 3 to 5 mm.

EXAMPLE 2

In this example the slurry of the precipitated basic nickel carbonate and the mixture of the finely divided diluent materials contained a higher proportion of the diluent materials, thereby giving a product of lower nickel oxide content. The product was designated extrudates D.

EXAMPLE 3-5

In these examples varying amounts of a calcium aluminate cement having a low iron content (approx 1%) were employed per 100 parts of the calcined material so as to give products having a range of nickel oxide contents but the same proportion of nickel oxide relative to the diluent materials. The products were designated extrudates E, F, and G.

EXAMPLE 6

In this example precipitated basic cobalt carbonate was used in place of the precipitated basic nickel carbonate. The product was designated extrudates H.

The analyses and physical characteristics of extrudates D, E, F, G, and H were as set out in Table 3.

TABLE 3

| | | Extrudates D | E | F | G | H |
|---|---|---|---|---|---|---|
| Analysis* (%) | NiO | 19.5 | 25.9 | 31.7 | 36.4 | — |
| | CoO | — | — | — | — | 27.0 |
| | Fe$_2$O$_3$ | 5.7 | 0.5 | 0.7 | 0.7 | 7.5 |
| BET surface area (m$^2 \cdot$ g$^{-1}$) | | 60.7 | 26.2 | 91.3 | 67.4 | 39.4 |
| Helium density (g $\cdot$ cm$^{-3}$) | | 2.91 | 2.88 | 3.05 | 3.01 | 3.03 |
| Mercury density (g $\cdot$ cm$^{-3}$) | | 2.01 | 1.85 | 2.09 | 2.10 | 1.87 |
| Bulk density (g $\cdot$ cm$^{-3}$) | | 1.18 | 1.25 | 1.33 | 1.25 | 1.16 |
| Porosity (%) | | 31 | 36 | 32 | 30 | 38 |
| Pores >35 nm (%) | | 14 | 30 | 22 | 19 | 17 |
| Pores 15-35 nm (%) | | 66 | 47 | 49 | 56 | 46 |

*After ignition at 900° C.

The extrudates D, E, F, G, and H were tested for hypochlorite decomposition as described in Example 1 in relation to extrudates A. The results were as set out in Table 4.

TABLE 4

| time (hr) | space velocity (hr$^{-1}$) | NaOCl concentration (g/100 ml) inlet | outlet D | outlet E | outlet F | outlet G | outlet H |
|---|---|---|---|---|---|---|---|
| 20 | 0.87 | 7.49 | | 0.21 | | | |
| 20 | 0.96 | 7.49 | | | 0.01 | | |
| 20 | 1.08 | 7.49 | | | | 0.30 | |
| 22 | 0.92 | 7.49 | 0.74 | | | | |
| 44 | 0.74 | 8.98 | 0.36 | | | | |
| 44 | 0.90 | 8.98 | | 0.06 | | | |
| 44 | 0.96 | 8.98 | | | <0.01 | | |
| 44 | 1.01 | 8.98 | | | | 0.12 | |
| 93 | 0.63 | 8.66 | | | | | 0.37 |
| 236 | 0.77 | 6.68 | 0.09 | | | 0.02 | |
| 236 | 0.70 | 6.68 | | <0.01 | | | |
| 236 | 0.75 | 6.68 | | | <0.01 | | |
| 381 | 0.40 | 12.34 | | | | | 0.07 |
| 884 | 0.90 | 10.88 | 0.08 | <0.01 | <0.01 | <0.01 | |

It is seen from these results that with the exception of extrudates F, there is a considerable induction period before the catalyst attains its full activity. This is thought to represent the time taken for the catalyst to become oxidised to the fully active state.

EXAMPLE 7

In this example, the procedure of Example 1 used to make extrudates A was modified only by employing the pellet mill die giving extrudates, designated herein extrudates I, of diameter about 1.6 mm and lengths in the range about 3 to 5 mm.

The extrudates I, which contained about 30% nickel oxide, were reduced by heating in a stream of hydrogen at atmospheric pressure and 450° C. and then cooled and stabilised with carbon dioxide and subsequently air. 30 ml of the stabilised pre-reduced extrudates were charged to a laboratory reactor provided with a fan effecting internal recycle. Benzene diluted with cyclohexane, and hydrogen diluted with argon, were continuously fed to the reactor which was maintained at a pressure of 30 bar abs., and at the temperature indicated in Table 5. The products were continuously withdrawn and analysed by gas chromatography. The reaction conditions, conversion, and selectivity, were as set out in Table 5.

TABLE 5

| Temp (°C.) | C/B* ratio | LHSV+ (h$^{-1}$) | feed (l/min) H$_2$ | feed (l/min) Ar | fan speed (rpm) | Conv. (%) | Select. (%) |
|---|---|---|---|---|---|---|---|
| 125 | 99/1 | 3.6 | 1 | 1.5 | 140 | 90.2 | >99.9 |
| 150 | 50/50 | 3.6 | 1 | 0.5 | 1000 | >99.9 | >99.9 |
| 180 | 50/50 | 3.6 | 1 | 0.5 | 1000 | >99.9 | >99.9 |

*cyclohexane to benzene ratio.
+ml of liquid (ie benzene plus cyclohexane) fed per hour per ml of catalyst.

Similar extrudates J were made having a diameter of about 2 mm and lengths in the range 3 to 5 mm. Also tablets K of diameter 5.4 mm and length 3.6 mm were made by the procedure used to make tablets B. When tested on a full scale commercial benzene hydrogenation plant, tablets K has an activity of about 66% of that of extrudates J. While this may in part be due to the larger tablet size decreasing the effectiveness of the tablets, calculation from the activity of tablets K shows that smaller tablets, of equivalent size to extrudates J, would still have an activity of only about 84% that of extrudates J.

We claim:

1. A catalytic hydrogenation process comprising contacting a catalyst effective to promote a hydrogenation reaction with a feed stream comprising gaseous hydrogen and an unsaturated hydrocarbon thereby hydrogenating at least some of said unsaturated hydrocarbon, said catalyst being prepared from a precursor comprising a calcium aluminate cement and at least one oxide of a metal selected from nickel and cobalt by reduction of said metal oxide, and wherein said precursor contains 10 to 70% by weight of said metal oxide (expressed as the divalent oxide, MO) and has a porosity in the range 25 to 50%, in which at least 30% of the pore volume is in the form of pores of size in the range 15 to 35 nm and less than 40% of the pore volume is in the form of pores of diameter greater than 35 nm.

2. A catalytic hydrogenation process according to claim 1, wherein the feed stream comprises benzene and gaseous hydrogen.

3. A catalytic hydrogenation process according to claim 1 comprising contacting a catalyst effective to promote a hydrogenation reaction with a feed stream comprising gaseous hydrogen and an unsaturated hydrocarbon thereby hydrogenating at least some of said unsaturated hydrocarbon, said catalyst being prepared from a precursor comprising a mixture of a calcium aluminate cement and from 10 to 70% by weight of at least one oxide of a metal selected from nickel and cobalt (expressed as the divalent oxide, MO) by reduction of said metal oxide, and wherein said precursor is formed by extrusion of said mixture.

4. A catalytic hydrogenation process according to claim 1 comprising contacting a catalyst effective to promote a hydrogenation reaction with a feed stream comprising gaseous hydrogen and an unsaturated hydrocarbon thereby hydrogenating at least some of said unsaturated hydrocarbon, said catalyst being prepared from a precursor comprising a mixture of a calcium aluminate cement and from 10 to 70% by weight of at least one oxide of a metal selected from nickel and cobalt (expressed as the divalent oxide, MO) by reduction of said metal oxide, and wherein said precursor is formed by extrusion of said mixture such that the precursor has a porosity in the range 25 to 50%, in which at least 30% of the pore volume is in the form of pores of size in the range 15 to 35 nm and less than 40% of the pore volume is in the form of pores of diameter greater than 35 nm.

* * * * *